(12) United States Patent
Wu

(10) Patent No.: US 6,230,860 B1
(45) Date of Patent: May 15, 2001

(54) MOBILE PHONE BATTERY CHARGER WITH POWER CORD WINDING MECHANISM

(75) Inventor: Clark Wu, Taipei (TW)

(73) Assignee: Tempa Communication Inc., Taipei (TW)

(*) Notice: Subject to any disclaimer, the term of this patent is extended or adjusted under 35 U.S.C. 154(b) by 0 days.

(21) Appl. No.: 09/512,335

(22) Filed: Feb. 24, 2000

(51) Int. Cl.[7] .................................................. H02G 11/02
(52) U.S. Cl. ..................... 191/12.2 R; 191/12.4; 191/12.2 A; 191/12 R
(58) Field of Search ............... 191/12 R, 12.2 R, 191/12.4, 12.2 A; 242/96, 107.11, 107.13; 310/77

(56) References Cited

U.S. PATENT DOCUMENTS

| | | | |
|---|---|---|---|
| 4,232,837 | * | 11/1980 | Cutler et al. ........................ 242/107 |
| 4,893,037 | * | 1/1990 | Schwartz ............................ 310/68 B |
| 4,904,205 | * | 2/1990 | Rice ..................................... 439/504 |
| 5,590,749 | * | 1/1997 | Wagner et al. ....................... 191/12.4 |
| 5,689,171 | * | 11/1997 | Ludewig .................................. 320/2 |
| 5,754,625 | * | 5/1998 | Shimura .................................. 379/61 |
| 6,059,081 | * | 5/2000 | Patterson et al. .................... 191/12.2 |

\* cited by examiner

*Primary Examiner*—S. Joseph Morano
*Assistant Examiner*—Frantz F. Jules
(74) *Attorney, Agent, or Firm*—Dougherty & Troxell

(57) ABSTRACT

A mobile phone battery charger with a power cord winding mechanism is disclosed. The battery charger is formed with a power cord receiving chamber in which a winding reel is disposed. An upper end surface of the winding reel is disposed with two contacts connected with the power cord. One contact is disposed at the center of the upper end surface of the winding reel, while the other contact is formed as a circumferential contact around the central contact. A pair of inner terminals of the power cord are respectively soldered at the two contacts, and a pair of outer terminals of the power cord are extended through a passage out of the battery charger. Two resilient plates extend from a diaphragm of the battery charger into the receiving chamber. The resilient plates respectively contact with the two contacts. The winding reel is fitted around a projecting shaft formed on the bottom of the receiving chamber. A coil spring is arranged between the winding reel and the projecting shaft to provide a rotating force for the winding reel to wind up the power cord.

5 Claims, 5 Drawing Sheets

MOBILE PHONE BATTERY CHARGER WITH POWER CORD WINDING MECHANISM

BACKGROUND OF THE INVENTION

1. Field of the Invention

The present invention relates to a mobile phone battery charger, and more particularly to a mobile phone battery charger with a power cord winding mechanism. When the battery charger is not used, the winding mechanism is able to wind up the power cord of the battery charger to prevent the power cord from being exposed outside.

2. Description of the Prior Art

Mobile phones have been more and more widely used nowadays. Typically, a mobile phone battery charger for the mobile phone is connected with a long power cord with an electric plug. In the case that the battery charger of the mobile phone and other electric appliances, such as an electric fan, must use an electric socket or an extension wire, numerous power cords will randomly scatter over the floor. Under such circumstance, dust tends to accumulate on the power cords and a user will have disorderly visual feeling. Furthermore, when the user carries the mobile phone battery charger to use outdoors, the exposed power cord will make it inconvenient to carry and store the battery charger.

Some of the existent domestic electric appliances, such as dust cleaner, are equipped with an automatic cable winding mechanism. However, such cable winding mechanism cannot be directly adapted to the battery charger of the mobile phone. Therefore, it is necessary to provide a power cord winding mechanism for the mobile phone battery charger, which has specific and fine structure and is able to wind up the power cord. When the battery charger is not used, the power cord can be wound in the battery charger without being exposed outside.

SUMMARY OF THE INVENTION

Consequently, the primary object of the present invention is to provide a power cord winding mechanism for a mobile phone battery charger. By means of the power cord winding mechanism, the power cord extended from the mobile phone battery charger can be wound in the battery charger.

To achieve the above objects, in accordance with a preferred embodiment of the present invention, there is provided a battery charger formed with a power cord receiving chamber therein. A winding reel is disposed in the receiving chamber for winding the power cord. The upper end surface of the winding reel is disposed with two contacts connected with the power cord. Two resilient plates are fixedly disposed on upper side of the receiving chamber to respectively contact with the contacts. A coil spring is arranged between the winding reel and the projecting shaft to provide a rotating force for the winding reel to wind up the power cord. One of the contacts is disposed at the center of the upper end surface of the winding reel, while the other contact is formed as a circumferential contact around the central contact. Accordingly, when the winding reel is rotated, the two resilient plates are kept one-to-one in contact with the two contacts.

In order that the present invention may more readily be understood, the following description is given, merely be way of example, reference being made to the accompanying drawings, wherein:

DETAILED DESCRIPTION OF THE PREFERRED EMBODIMENT

Figure 1:
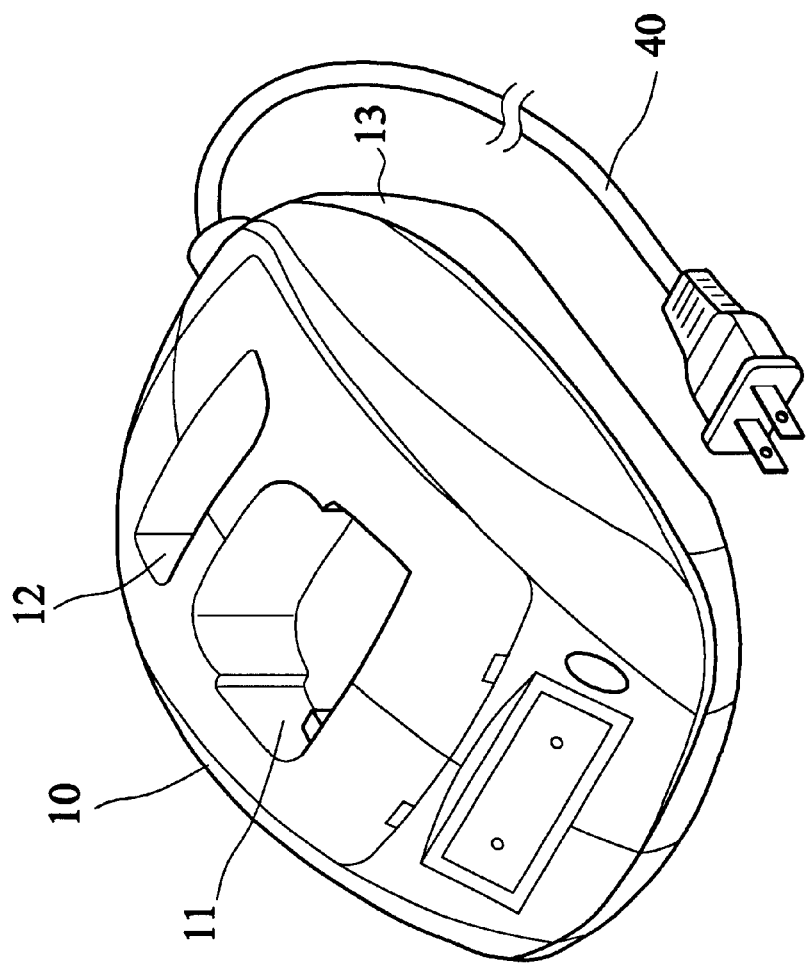
FIG. 1 is a perspective view of a battery charger in accordance with a preferred embodiment of the present invention.

With reference to FIG. 1, there is shown a perspective view of a battery charger in accordance with a preferred embodiment of the present invention. The casing of the mobile phone battery charger 10 of the present invention is formed with two charging sockets 11, 12. A mobile phone attached with a battery can be inserted into the first charging socket 11, and a mobile phone battery can be inserted into the second charging socket 12. The base 13 of the battery charger 10 is formed with an inner space therein serving as a power cord receiving chamber in which a power cord 40 can be wound and received.

Figure 2:
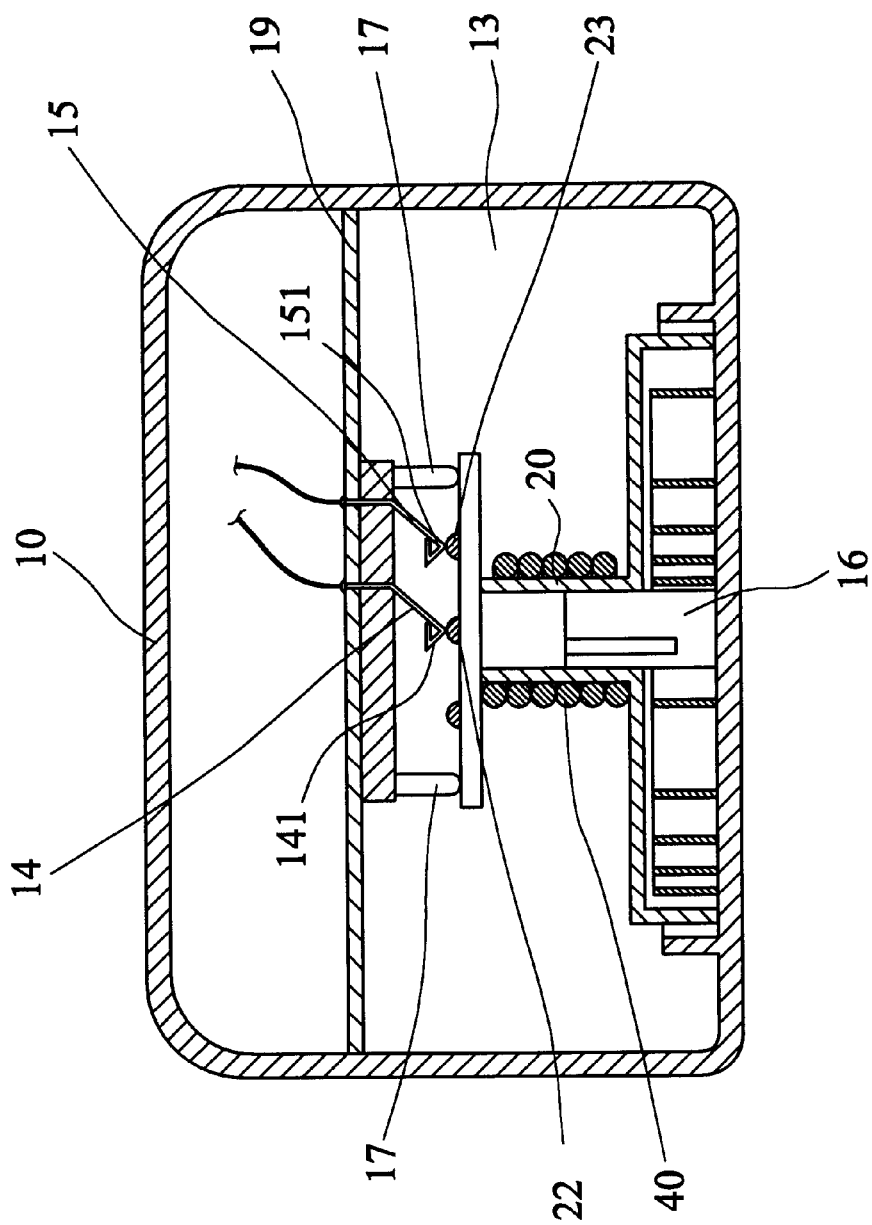
FIG. 2 is a sectional view showing the internal structure of the battery charger of the present invention.
Figure 3:
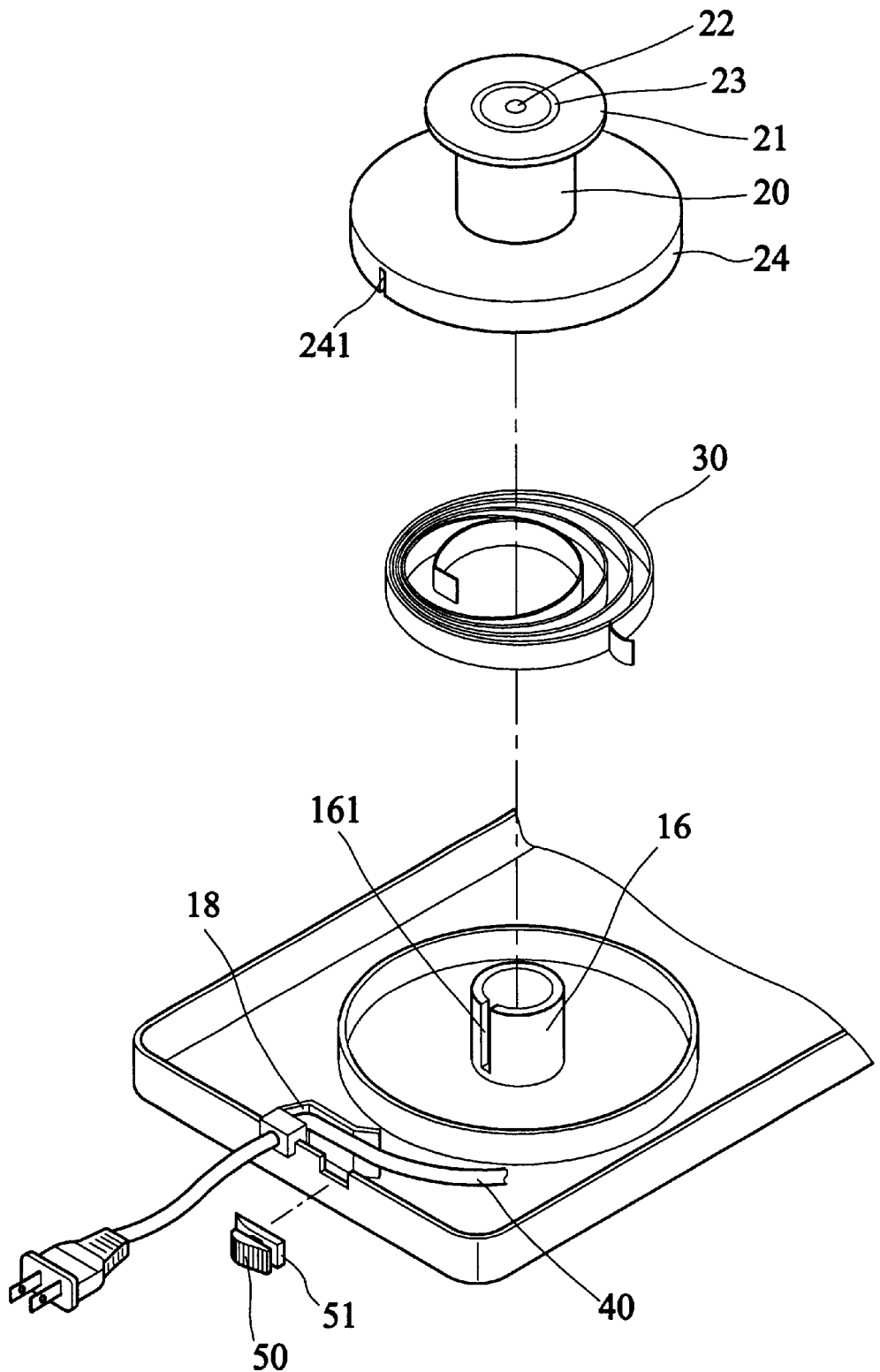
FIG. 3 is a perspective exploded view of the power cord winding mechanism of the present invention.

Referring to FIGS. 2 and 3, a power cord winding reel 20 is disposed in the battery charger 10. The upper end surface 21 of the winding reel 20 is disposed with two contacts 22, 23. One contact 22 is disposed at the center of the upper end surface 21 of the winding reel 20, while the other contact 23 is formed as a circumferential contact around the central contact 22.

A pair of inner terminals of the power cord are respectively soldered at the central contact and the circumferential contact and a pair of outer terminals of the power cord are extended through a passage out of the battery charger.

Two resilient plates 14, 15 extend from a diaphragm 19 of the battery charger 10 above the receiving chamber 13. The resilient plates 14, 15 respectively have protuberances 141, 151 in contact with the two contacts 22, 23.

Figure 4:
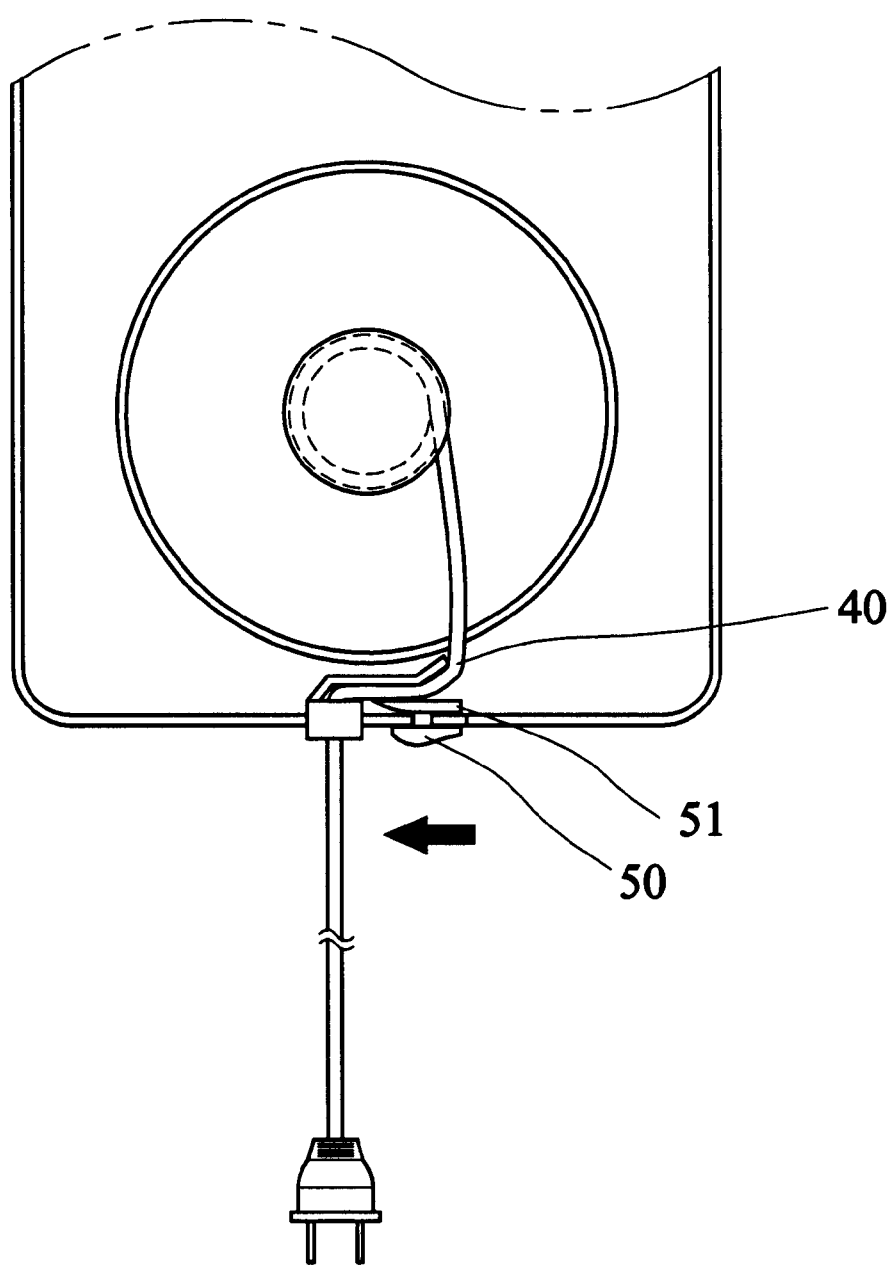
FIG. 4 is a top plane view of the present invention, showing the power cord is extended from the battery charger of the present invention.

The winding reel 20 is fitted around a projecting shaft 16 formed on the bottom plate of the receiving chamber 10 and is rotatable about the projecting shaft 16. An inner end of a coil spring 30 is hooked in a vertical slit 161 of the projecting shaft 16 and an outer end of the coil spring 30 is hooked in a vertical slit 241 of a lower edge 24 of the winding reel 20, whereby the winding reel 20 is able to wind up the power cord 40. When the power cord 40 is extended from the battery charger, a shift button 50 can be pushed to clamp the power cord 40 and fix the power cord 40 in an extended state as shown in FIG. 4.

The two contacts 22, 23 arranged on the upper end surface of the winding reel 20 are one-to-one in contact with the resilient plates 14, 15 on upper side of the receiving chamber 13. When the winding reel 20 is rotated, the central contact 22 is rotated at the home position without displacement so that the central contact 22 is kept in contact with the protuberance 141 of the resilient plate 14. The circumferential contact 23 of the upper end surface 21 of the winding reel 20 is maintained as a circular shape during rotation of the winding reel 20 so that the circumferential contact 23 is also kept in contact with the protuberance 151 of the other resilient plate 15. Accordingly, in both extended and wound states, the power cord 40 is electrically connected with the charging circuit of the battery charger 10.

In order to prevent the winding reel 20 from being excessively shifted up or down, three or four downward projecting posts 17 as shown in FIG. 2 may be formed on the bottom surface of the diaphragm 19. By means of the downward projecting posts 17, the pressure between the resilient plates 14, 15 and the upper end surface 21 of the winding reel 20 will not be changed to lead to over-displacement of the winding reel 20.

The lower ends of the two resilient plates 14, 15 are bent to form the protuberances 141, 151. The contacts 22, 23 of the upper end surface 21 of the winding reel 20 are electrically one-to-one in contact with the protuberances 141, 151 of the resilient plates 14, 15. So, when the winding reel 20 is rotated, the resilient plates 14, 15 are ensured to contact with the contacts 22, 23.

Figure 5:
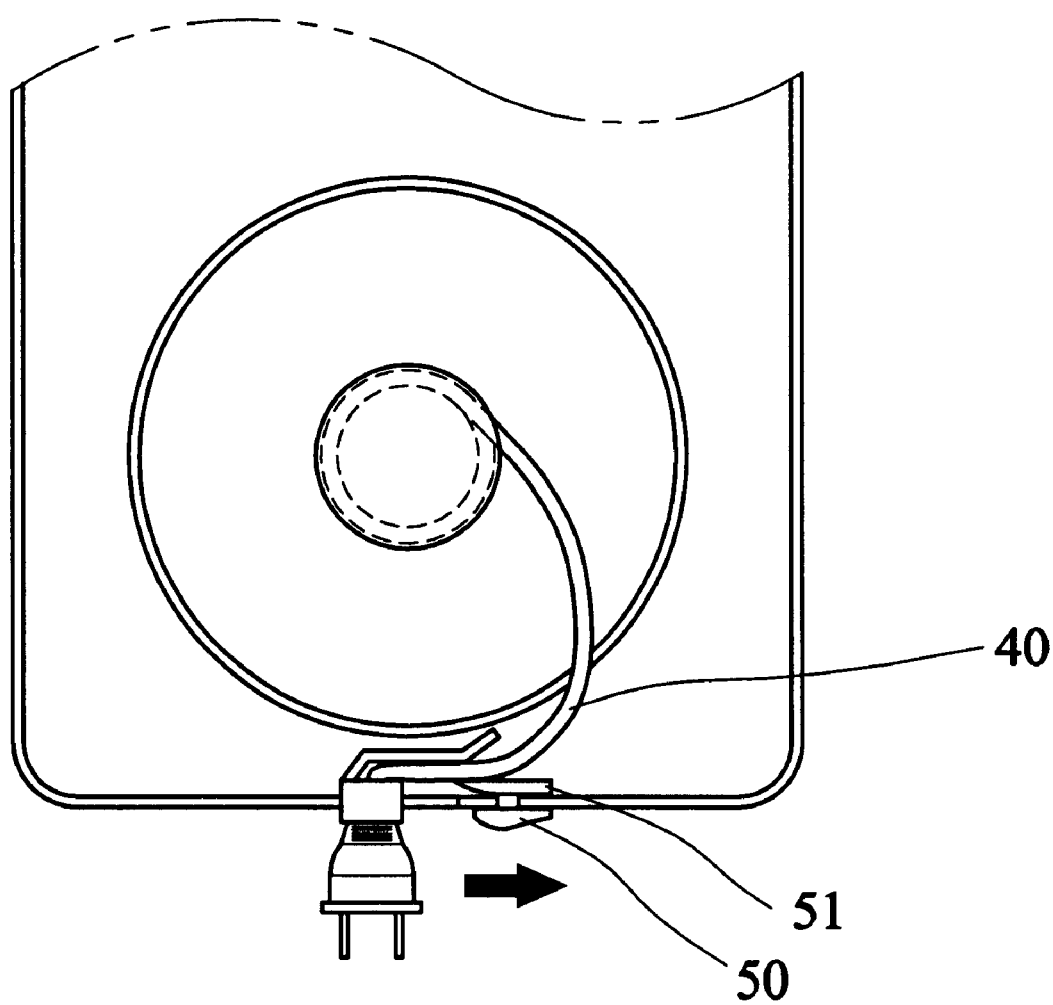
FIG. 5 is a top plane view of the present invention, showing the power cord is wound in the battery charger.

In order to conveniently conduct the power cord 40 out of the receiving chamber 13, a guide way 18, as shown in FIG. 3, is formed in the receiving chamber 13, through which the power cord 40 is guided and extended out of the battery charger 10. The shift button 50 is shifted to clamp and tightly locate the power cord 40 between the inner surface 51 of the shift button 50 and the inner wall of the guide way 18. Under such circumstance, the winding reel 20 is unable to wind up the power cord 40. When the shift button 50 is restored to its home position as shown in FIG. 5, the winding reel 20 can wind up the power cord 40.

According to the above arrangement of the power cord winding mechanism of the present invention, the power cord may be pulled out to supply electric power energy to the battery charger. After the charging is completed, the power cord may be wound and received in the battery charger. Therefore, the power cord is prevented from randomly scattering over the floor and the battery charger can be easily carried and stored.

The above embodiment is only used to illustrate the present invention, not intended to limit the scope thereof. Many modifications of the above embodiment can be made without departing from the spirit of the present invention.

What is claimed is:

1. A mobile phone battery charger with a power cord and a power cord winding mechanism for winding the power cord in the battery charger, comprising:

a battery charger casing with at least one charging socket formed thereon;

a power cord receiving chamber formed within the battery charger casing;

a projecting shaft projecting from a bottom plate of the battery charger casing into the power cord receiving chamber;

a power cord winding reel rotatably mounted on the projecting shaft;

a power cord wound around the winding reel;

a coil spring connected between the winding reel and the projecting shaft to provide a rotating force for the winding reel to wind up the power cord;

a central contact arranged on a center of the power cord winding reel, and a circumferential contact located around the central contact, a pair of inner terminals of the power cord being respectively soldered to the central contact and the circumferential contact and a pair of outer terminals of the power cord extending out of the battery charger through a passage in the battery charger casing; and two resilient plates extending from a diaphragm in the battery charger casing into the receiving chamber, the resilient plates respectively contacting the central contact and the circumferential contact.

2. The mobile phone battery charger with a power cord winding mechanism as claimed in claim 1, further comprising a plurality of downward projecting posts formed on a bottom surface of the diaphragm of the battery charger and contacting the winding reel.

3. The mobile phone battery charger with a power cord winding mechanism as claimed in claim 1, further comprising a guide way in the receiving chamber, the guide way guiding the movement of the power cord in a predetermined direction.

4. The mobile phone battery charger with a power cord winding mechanism as claimed in claim 3, further comprising a shift button movably mounted on the battery charger casing at the guide way, the shift button being shifted to tightly clamp the power cord when the power cord is extended from the battery charger.

5. The mobile phone battery charger with a power cord winding mechanism as claimed in claim 1, wherein an inner end of the coil spring is hooked in a vertical slit in the projecting shaft and an outer end of the coil spring is hooked in a vertical slit in a lower end face of the winding reel.

\* \* \* \* \*